(12) United States Patent  
Mickley et al.

(10) Patent No.: US 9,592,728 B1  
(45) Date of Patent: Mar. 14, 2017

(54) BUSHING MOUNT AND HOLDING STRUCTURE FOR IN-VEHICLE COMPONENT

(71) Applicant: DENSO International America, Inc., Southfield, MI (US)

(72) Inventors: Peter Mickley, Royal Oak, MI (US); Justin Harris, Southfield, MI (US)

(73) Assignee: DENSO International America, Inc., Southfield, MI (US)

( * ) Notice: Subject to any disclaimer, the term of this patent is extended or adjusted under 35 U.S.C. 154(b) by 0 days.

(21) Appl. No.: 15/097,628

(22) Filed: Apr. 13, 2016

(51) Int. Cl.
    *B60K 11/04*     (2006.01)
    *B62D 25/08*     (2006.01)
    *F16B 9/02*     (2006.01)

(52) U.S. Cl.
    CPC ............ *B60K 11/04* (2013.01); *B62D 25/085* (2013.01); *F16B 9/02* (2013.01)

(58) Field of Classification Search
    CPC .... B62D 25/08; B62D 25/082; B62D 25/084; B62D 25/085; F16B 9/00; F16B 9/02; B60K 11/04
    USPC .............................................. 180/68.4, 68.6
    See application file for complete search history.

(56) References Cited

U.S. PATENT DOCUMENTS

| | | | | |
|---|---|---|---|---|
| 4,770,234 A | * | 9/1988 | Hiraoka ................. | B60K 11/04 165/67 |
| 6,260,609 B1 | * | 7/2001 | Takahashi .............. | B60K 11/04 165/67 |
| 8,051,933 B2 | * | 11/2011 | Hwang .............. | B60H 1/00535 180/68.4 |
| 8,826,538 B2 | * | 9/2014 | Itoh ........................ | B60K 11/04 180/68.4 |

* cited by examiner

*Primary Examiner* — John Walters

(57) ABSTRACT

A bushing mount for an in-vehicle component disposed on a vehicle body includes a support and an insertion portion. The support includes a support body defining a pin hole therein, and the insertion portion is connected to the support. The support body includes a contact surface that abuts the vehicle body when the insertion portion is inserted into an attachment hole formed in the vehicle body. The support supports, when a pin of the in-vehicle component is inserted into the pin hole, the in-vehicle component while being interposed between the vehicle body and the in-vehicle component. The support includes a removal portion that allows the pin to be removed out of the pin hole in a direction angled from a center axis of the pin hole.

17 Claims, 8 Drawing Sheets

FIRST DIRECTION
SECOND DIRECTION

FIRST DIRECTION
SECOND DIRECTION

FIRST DIRECTION
SECOND DIRECTION

BUSHING MOUNT AND HOLDING STRUCTURE FOR IN-VEHICLE COMPONENT

TECHNICAL FIELD

The present disclosure relates to a bushing mount and a holding structure for an in-vehicle component.

BACKGROUND

Conventionally, a vehicle has a structure for holding an in-vehicle component, such as a cooling module, on a front-end part. The holding structure allows the cooling module to move in a rearward direction of the vehicle when a front impact force due to a vehicle collision acts on the cooling module. The holding structure includes a bushing mount to hold the cooling module, and the cooling module is fixed to a vehicle body, such as a frame of the vehicle, via the bushing mount.

SUMMARY

According to an aspect of the present disclosure, a bushing mount for an in-vehicle component disposed on a vehicle body includes a support and an insertion portion. The support includes a support body defining a pin hole therein, and the insertion portion is connected to the support. The support body includes a contact surface that abuts the vehicle body when the insertion portion is inserted into an attachment hole formed in the vehicle body. The support supports, when a pin of the in-vehicle component is inserted into the pin hole, the in-vehicle component while being interposed between the vehicle body and the in-vehicle component. The support includes a removal portion that allows the pin to be removed out of the pin hole in a direction angled from a center axis of the pin hole.

According to another aspect of the present disclosure, a holding structure for an in-vehicle component on a vehicle body includes a pin, a bushing mount and a holding base. The pin is disposed in the in-vehicle component, and the bushing mount includes a support and an insertion portion. The holding base is included in the vehicle body. The support includes a support body defining a pin hole therein, and the insertion portion is connected to the support. The support body includes a contact surface that abuts the holding base when the insertion portion is inserted into an attachment hole formed in the holding base. The support supports, when a pin of the in-vehicle component is inserted into the pin hole, the in-vehicle component while being interposed between the holding base and the in-vehicle component. The support includes a removal portion that allows the pin to be removed out of the pin hole in a direction angled from a center axis of the pin hole.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
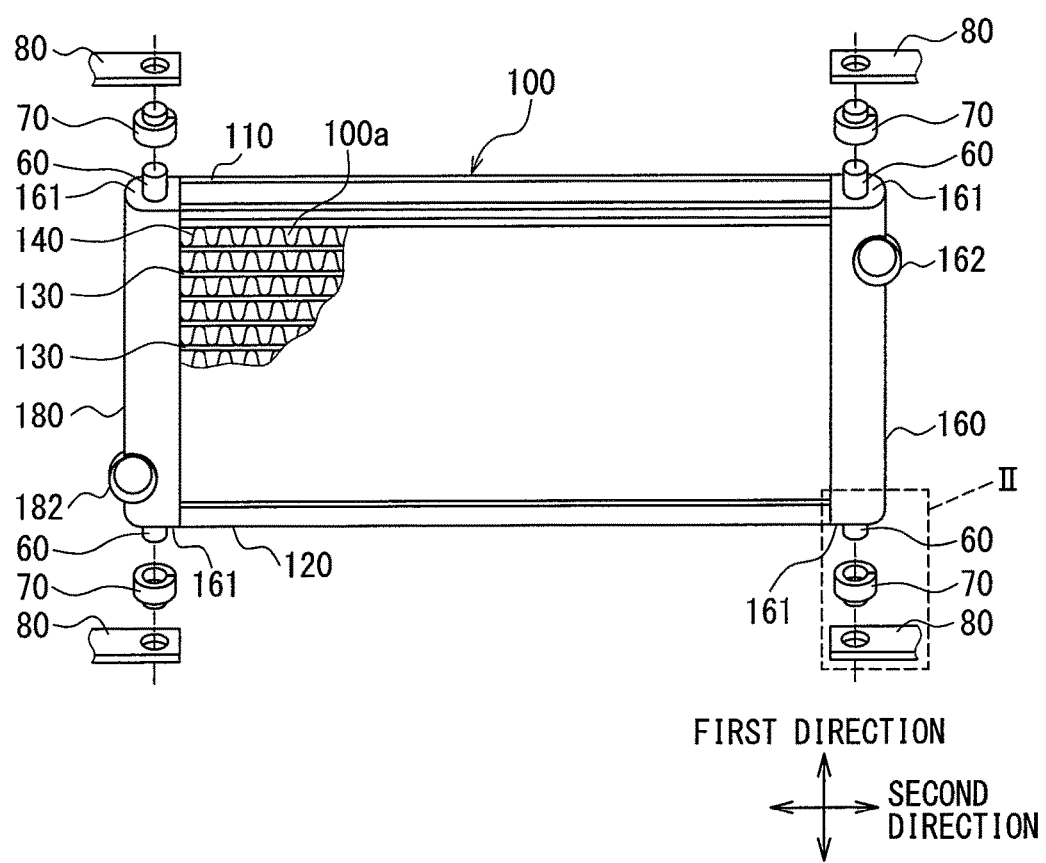
FIG. 1 is a perspective view showing a radiator according to a first embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As follows, a first embodiment of the present disclosure will be described with reference to FIGS. 1 to 7. In the descriptions and the drawings, a "first direction" extends along a vertical direction in gravity, and a "second direction" is generally perpendicular to the first direction and generally parallel to a horizontal direction, though the first direction and the second direction are not limited thereto.

In the present embodiment, a radiator 100 as an in-vehicle component is attached to a frame (vehicle body) of a vehicle through a holding mechanism as described below. The frame defines an engine room in which an internal combustion engine is installed. The engine room is positioned on a front side of the vehicle, and the radiator 100 is disposed in a front-end part of the engine room. As shown in FIG. 1, in the example, the frame includes four brackets (holding bases) 80 by which four corners of the radiator 100 are respectively held.

The radiator 100 includes a pair of tanks (tank bodies) 160 and 180, multiple tubes 130, multiple fins 140, and side plates 110 and 120 disposed on both side ends of the radiator 100 in the first direction. The fins 140 and the tubes 130 may be alternately arranged along the first direction and form a core 100a of the radiator 100. The radiator 100 includes an inlet 162 and an outlet 182, and both the inlet 162 and the outlet 182 may be connected with an internal combustion engine through unillustrated pipes. Cooling water (thermal medium) is circulated between the radiator 100 and the internal combustion engine. The core 100a is interposed between the tank 160 and 180 in the second direction.

As shown in FIG. 1, each of the tanks 160 and 180 has end surfaces 161 at both opposite side ends in the first direction, and a pin 60 is disposed on the respective end surface 161. The pin 60 has a cylindrical shape and protrudes from the end surface 161 along the first direction. Each pin 60 is fixed to the bracket 80 through a bushing mount 70. The pin 60, the bushing mount 70 and the bracket 80, as main components, forms a holding structure that holds the radiator 100.

Figure 2:
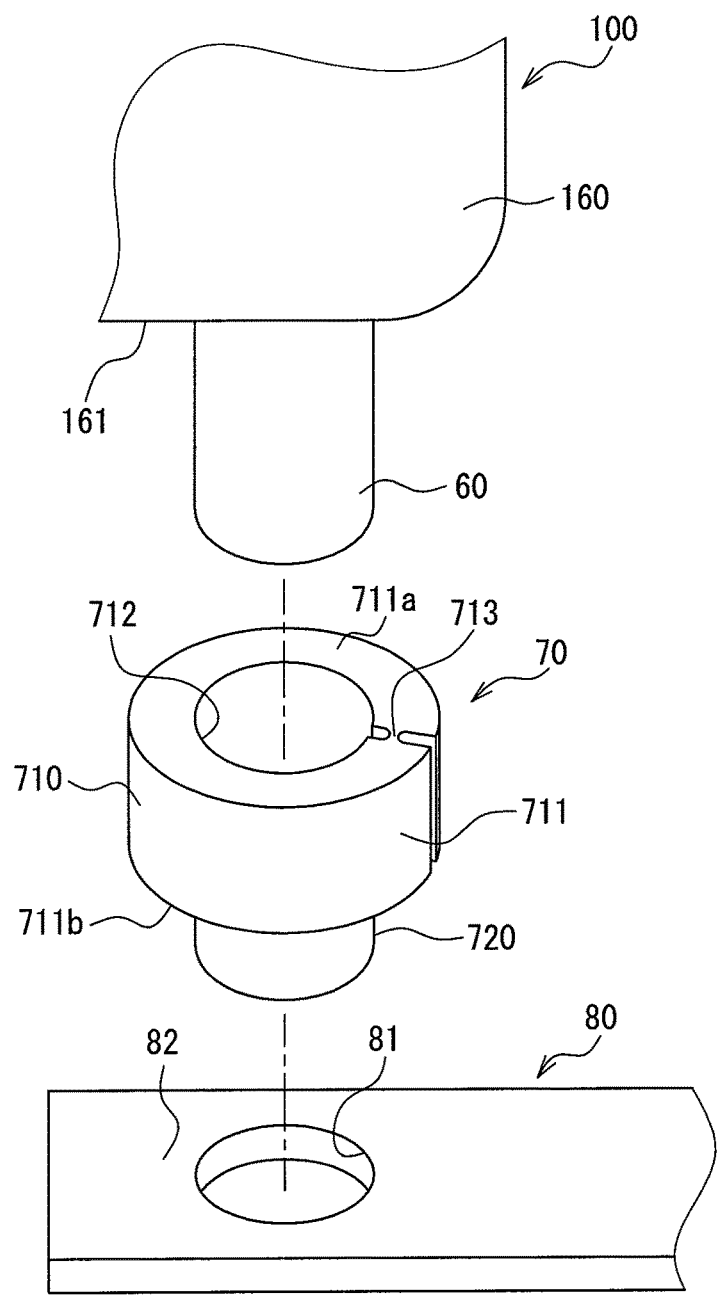
FIG. 2 is an exploded perspective view showing a holding structure corresponding to portion II of FIG. 1.
Figure 3:
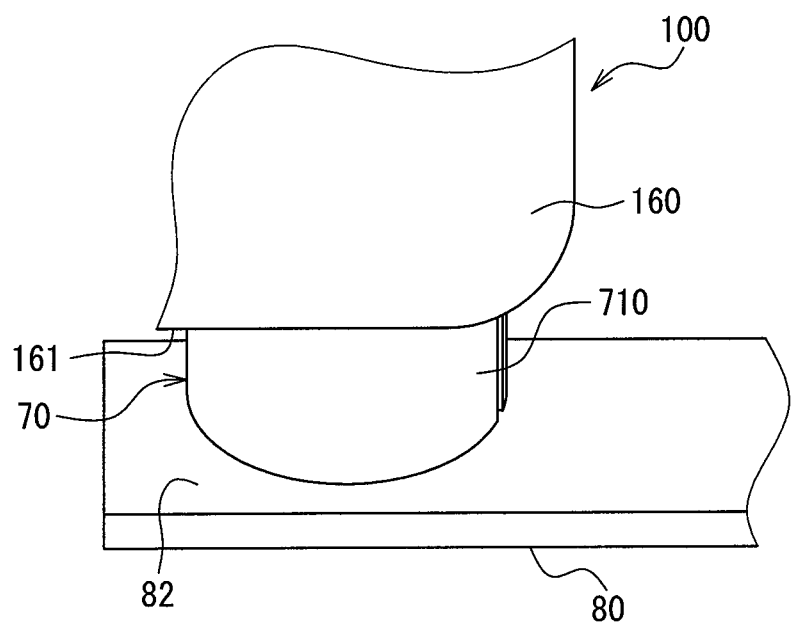
FIG. 3 is an assembled view showing the holding structure.
Figure 3:
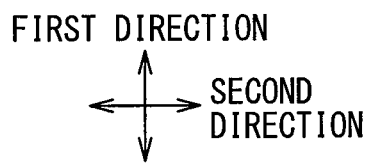

The bushing mount 70 is made of a pliable material such as rubber or resin to be elastically deformable. As shown in FIG. 2, the bushing mount 70 includes a support 710, and an insertion portion 720. The insertion portion 720 is connected to one end surface of the support 710 facing in the first direction. The insertion portion 720 of the bushing mount 70 is inserted into an attachment hole 81 formed in the bracket 80.

Figure 4:
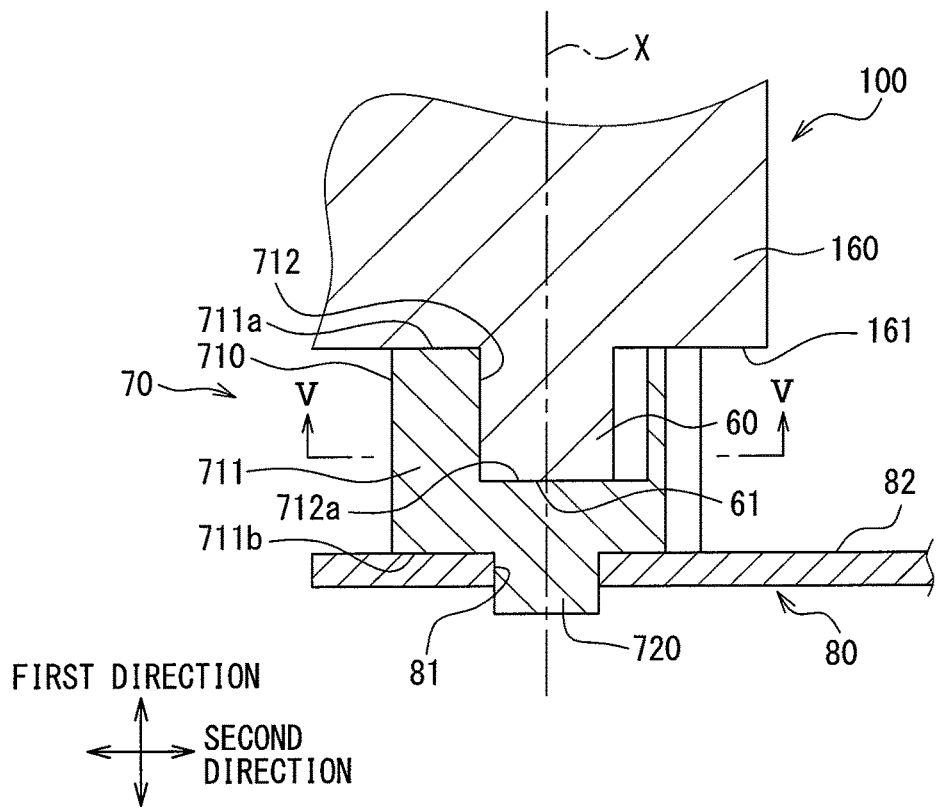
FIG. 4 is a cross-sectional view showing the holding structure.
Figure 5:
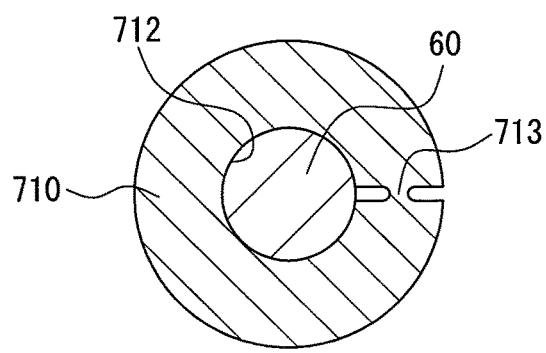
FIG. 5 is a cross-sectional view taken along line V-V of FIG. 4.
Figure 6:
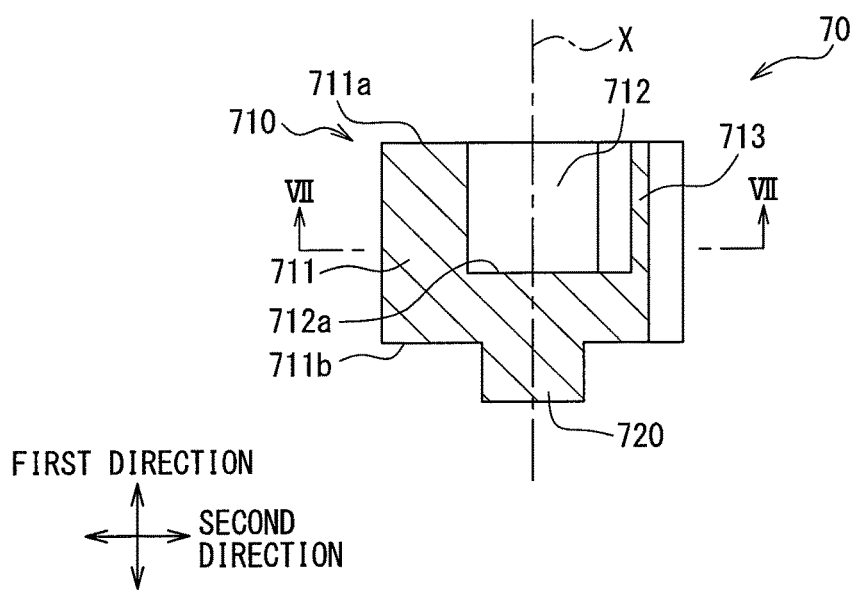
FIG. 6 is a cross-sectional view showing a bushing mount according to the first embodiment.
Figure 7:
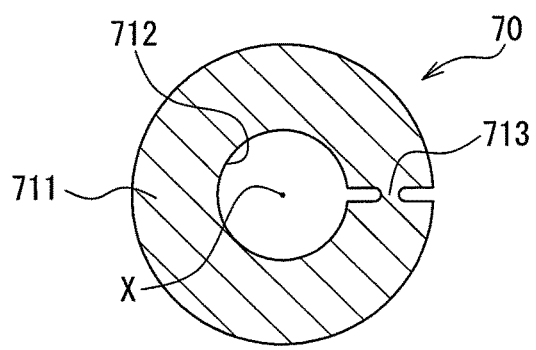
FIG. 7 is a cross-sectional view taken along line VII-VII of FIG. 6.

The support 710 includes, as shown in FIGS. 6 and 7, a support body 711, a pin hole 712 and a breakable section 713. The support body 711 has a cylindrical shape and defines the pin hole 712 therein. The pin hole 712 extends in the first direction and has a cylindrical shape. The support body 711 has a first surface 711a and a second surface 711b, both of which are opposite to each other in an axial direction of a center axis X of the pin hole 712, i.e., the first direction. The first surface 711a abuts the end surface 161 of the tank 160 when the pin 60 is inserted into the pin hole 712. As shown in FIG. 4, when the pin 60 is inserted into the pin hole 712, a distal end 61 of the pin 60 is positioned inside the pin hole 712. More specifically, the first surface 711a functions as a first holding surface that holds the radiator 100 such that the distal end 61 of the pin 60 is positioned inside the pin hole 712. The first surface 711a has a shape to fit to the end surface 161. For example, both the first surface 711a and the end surface 161 are flat. The second surface (contact surface) 711b of the support body 711 abuts a bracket surface 82 of the bracket 80 when the insertion portion 720 is inserted into the attachment hole 81 of the bracket 80. The second surface 711b has shape to fit to the bracket surface 82. For example, both the second surface 711b and the bracket surface 82 are flat. As shown in FIG. 4, the support 710 is interposed between the end surface 161 of the tank 160 and the bracket surface 82 of the bracket 80, when the pin 60 is inserted into the pin hole 712 and when the insertion portion 720 is inserted into the attachment hole 81. In this way, the support 710 stably supports the tank 160.

The pin hole 712 has a radius that is approximately the same as the pin 60 of the tank 160, and therefore the pin 60 is fitted into the pin hole 712. The pin hole 712 has an inner bottom 712a therein positioned between the first surface 711a and the second surface 711b in the first direction. In a state where the insertion portion 720 is inserted into the attachment hole 81, the inner bottom 712a is positioned between the bracket surface 82 and the end surface 161 (i.e., above the bracket surface 82 in FIG. 4). The distal end 61 of the pin 60 abuts the inner bottom 712a of the pin hole 712 when the pin 60 is inserted into the pin hole 712. As a result, the distal end 61 is also positioned between the bracket surface 82 and the end surface 161. Therefore, the inner bottom 712a functions as a second holding surface that holds the radiator 100 such that the distal end 61 of the pin 60 is positioned inside the pin hole 712.

The breakable section 713 is formed in the support body 711 as a thinner section having a radial thickness that is thinner than that of the support body 711. As shown in FIG. 7, the breakable section 713 is formed by cutting the support body 711 from both an inner wall and an outer wall of the support body 711 in the radial direction. Alternatively, the support body 711 may be molded in molding dies having blade-shaped portions to form notches on both sides of the breakable section 713 in the radial direction. Therefore, the breakable section 713 is likely to be broken as compared to the support body 711 when an external force generated by, e.g., an automotive collision is applied to the bushing mount 70. When the breakable section 713 is broken, the pin 60 is removed out of the pin hole 712 in a direction angled from the center axis X of the pin hole 712. For example, the pin 60 may be removed out of the pin hole 712 along the radial direction. The breakable section 713 may correspond to a removal portion that allows the pin 60 to be removed out of the pin hole 712 in a direction angled from the center axis X of the pin hole 712.

The insertion portion 720 protrudes from the second surface 711b of the support body 711 in the first direction. The insertion portion 720 has a cylindrical shape and is coaxial with the center axis X of the pin hole 712. The second surface 711b has an annular shape that surrounds the insertion portion 720. The outer diameter of the support body 711 is larger than the outer diameter of the insertion portion 720. The insertion portion 720 has a radius that is approximately the same as the attachment hole 81, thereby being fitted into the attachment hole 81.

As described above, the breakable section 713 of the bushing mount 70 is the thinner section having the radial thickness that is thinner than that of the support body 711 in the radial direction. Thus, for example, when a front impact force greater than a predetermined force acts on the radiator 100, the breakable section 713 is broken. As a result, the breakable section 713 allows the pin 60 to be removed out of the pin hole 712. More specifically, the pin 60 is allowed to be removed out of the pin hole 712 by moving across the support body 711 in the radial direction through the broken breakable section 713. Accordingly, the radiator 100 is detached from the frame of the vehicle without substantial damage to the pin 60, such as breakage or bend, whereby damage to the radiator 100 can be also suppressed. Therefore, leakage of cooling water circulating through the radiator 100 due to damage to the radiator 100 may be avoided even when, for example, a vehicle accident such as automotive collision happens. Furthermore, since the pin 60 can be removed out of the pin hole 712 without receiving substantial damage, the pin 60 (the radiator 100) can be reused without any repair. Additionally, the bushing mount 70 is made of resin and can be elastically deformable. Thus, the pin 60 can be easily removed out of the pin hole 712 by elastic deformation of the bushing mount 70, which further contributes to suppression of damage to the pin 60. In this way, an overall damage to the vehicle at the impact can be absorbed by the detachment of the radiator 100.

The first surface 711a and the bottom 712a of the pin hole 712 hold the radiator 100 such that the distal end 61 of the pin 60 is positioned inside the pin hole 712 of the support 710. In other words, the pin 60 is not inserted into the attachment hole 81 of the bracket 80, and thus the pin 60 can be removed out of the pin hole 712 without interference with the bracket 80. Therefore, both the pin 60 (the radiator 100) and the bracket 80 (the frame) receive substantially no damage during the removal of the pin 60 from the pin hole 712. Hence, the radiator 100 and the frame can be reused with the bushing mount 70 that is newly replaced.

The support 710 includes the first surface 711a as the first holding surface, and the inner bottom 712a as the second holding surface. Since the radiator 100 is held by both the first surface 711a and the inner bottom 712a, the radiator 100 is stably supported by the bushing mount 70.

Second Embodiment

A second embodiment of the present disclosure will be described with reference to FIGS. 8 and 9. In the second embodiment, the support 710 of the bushing mount 70 includes a slit 714 instead of the breakable section 713 described in the first embodiment. The slit 714 is formed in the support body 711. The slit 714 extends in the direction away from the center axis X of the pin hole 712. More specifically, the slit 714 extends in the radial direction of the center axis X. The slit 714 may correspond to the removal portion.

Similar to the first embodiment, when a front impact force greater than a predetermined force acts on the radiator 100, the pin 60 is allowed to be removed out of the pin hole 712 by moving across the support body 711 in the radial direction through the slit 714. Additionally, the pin 60 can be removed out of the pin hole 712 without substantial damage to the pin 60, the pin 60 (the radiator 100) can be reused without any repair.

Furthermore, the bushing mount 70 of the second embodiment is made of resin to be elastically deformable. Thus, due to the deformation of the bushing mount 70, the bushing mount 70 allows the removal of the pin 60 without being broken. Therefore, the bushing mount 70 also can be reused without any repair.

Although the present disclosure has been fully described in connection with the preferred embodiments thereof with reference to the accompanying drawings, it is to be noted that various changes and modifications described below will become apparent to those skilled in the art.

Figure 10:
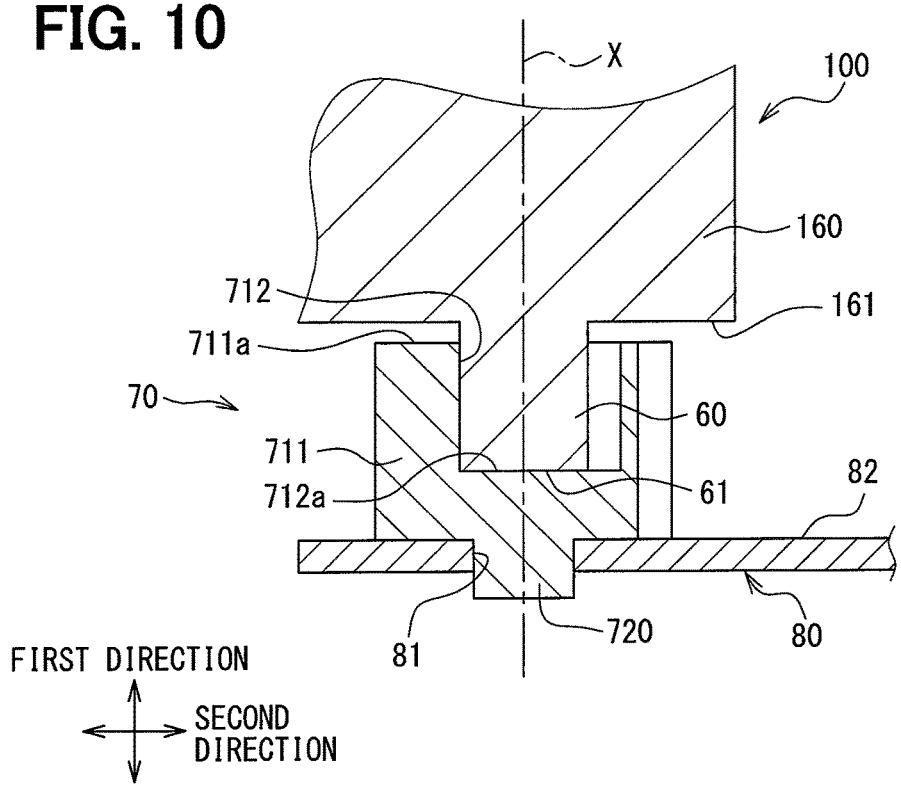
FIG. 10 is a cross-sectional view showing a holding structure according to a modification to the first embodiment.

As shown in FIG. 10, the first surface 711a of the support body 711 may be separated from the end surface 161 of the tank 160 in the state where the pin 60 is inserted into the pin hole 712. The depth of the pin hole 712 between the holding surface 711a and the inner bottom 712a is shorter than the length of the pin 60 in the first direction. In this case, the inner bottom 712a of the bin hole 712, which contacts the distal end 61 of the pin 60, may function as a holding surface that holds the radiator 100 such that the distal end 61 of the pin 60 is positioned inside the pin hole 712.

Figure 11:
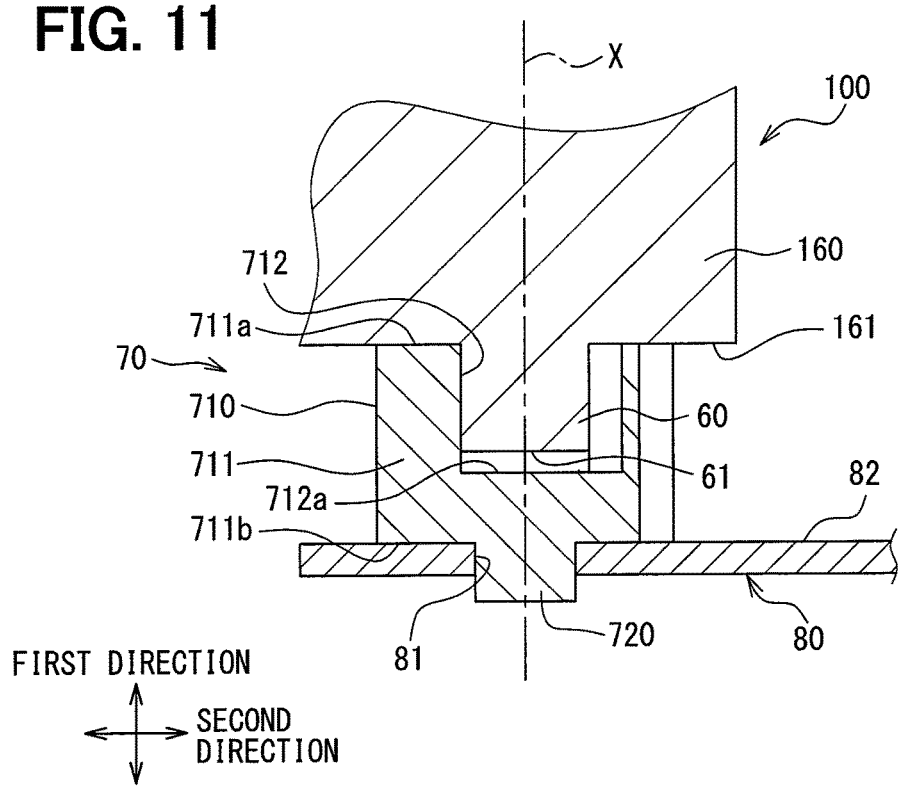
FIG. 11 is a cross-sectional view showing a holding structure according to another modification to the first embodiment.

Alternatively, as shown in FIG. 11, the distal end 61 of the pin 60 may be separated from the inner bottom 712a of the pin hole 712. In this case, the first surface 711a of the support body 711, which contacts the end surface 161 of the tank 160, may function as the holding surface. The support body 711 has a thickness between the holding surface and the second surface 711b in the center axis X of the pin hole 712. The thickness of the support body 711 is longer than a length of the pin 60 in the axial direction of the center axis X.

In those cases shown in FIGS. 10 and 11, the length of the pin 60 is not required to be exactly the same as the depth of the pin hole 712. Therefore, the bushing mount 70 can be easily manufactured and be used for pins having different lengths.

Figure 12:
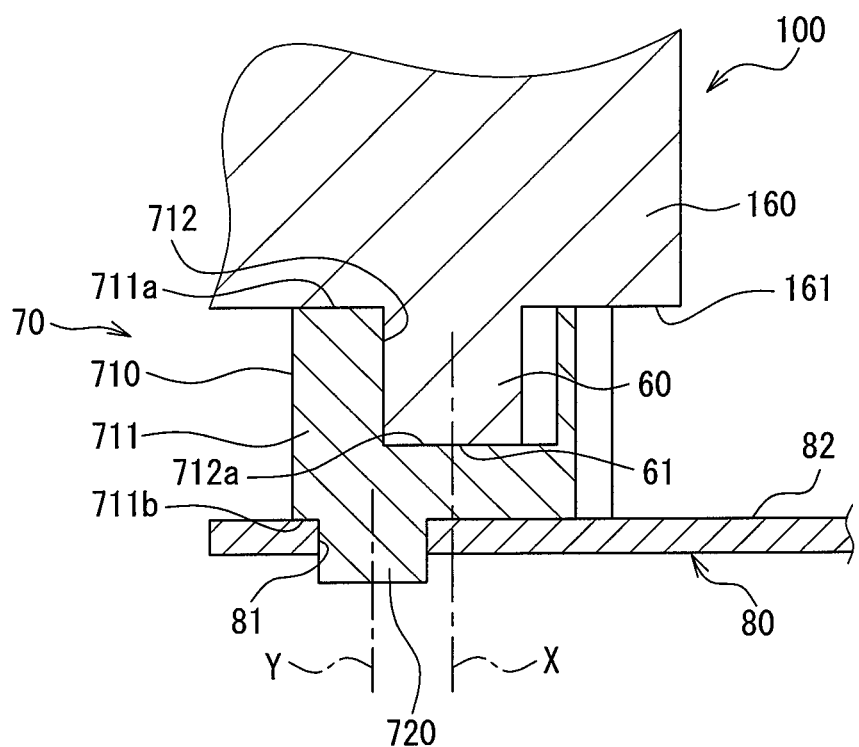
FIG. 12 is a cross-sectional view showing a holding structure according to another modification to the first embodiment.
Figure 12:
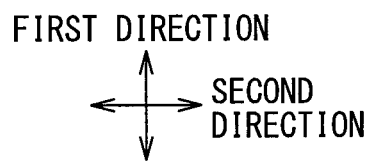

As shown in FIG. 12, the center axis X of the pin hole 712 may be offset from a center axis Y of the insertion portion 720. In this case, flexibility in design of the bushing mount 70 can be improved.

Figure 8:
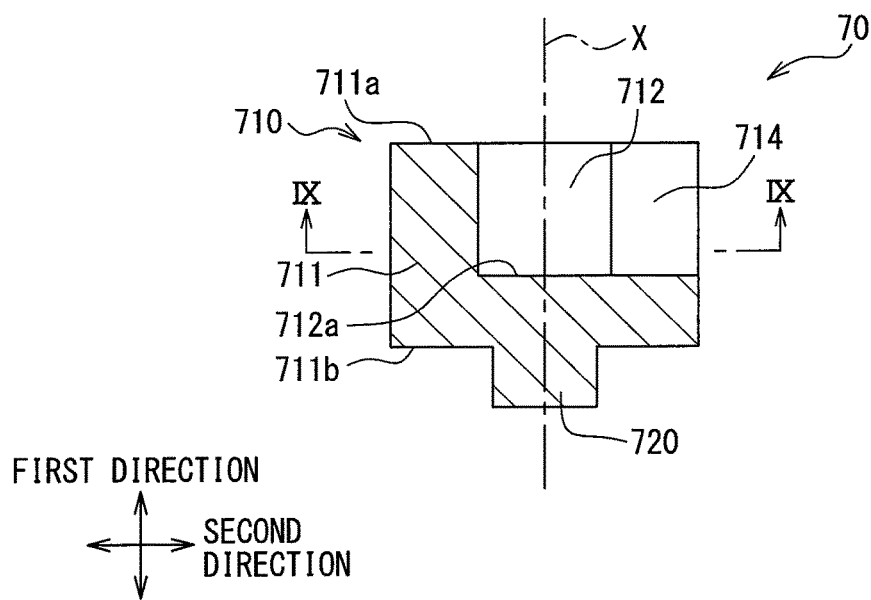
FIG. 8 is a cross-sectional view showing a bushing mount according to a second embodiment.
Figure 9:
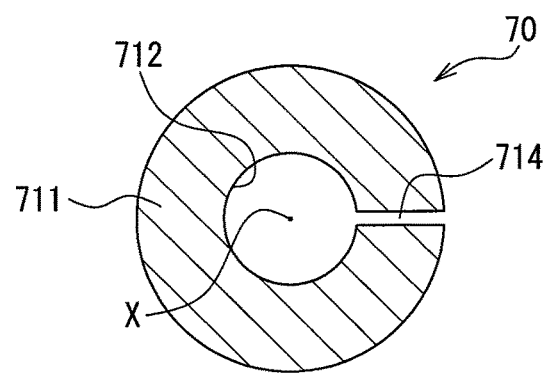
FIG. 9 is a cross-sectional view taken along line IX-IX of FIG. 8.

The breakable section 713 and the slit 714 extend in the radial direction in FIGS. 4, 6 and 8 in the above-described embodiments. However, the extending directions of the breakable section 713 or the slit 714 are not limited to the radial direction, and the breakable section 713 and the slit 714 may extend at least in the direction away from the center axis X of the pin hole 712. Further, a plurality of removal portions (i.e., the breakable sections 713 or the slits 714) may be formed in the support body 711. For example, a plurality of removal portions may be arranged in a circumferential direction of the support body 711 around the pin hole 712 at equal or unequal intervals. Accordingly, the pin 60 can be easily removed out of the pin hole in various directions, and the bushing mount 70 can be disposed without any regard to the position of the removal portions in the circumferential direction.

The pin 60 protrudes from the end surface 161 of the tank 160, 180, but the pin 60 may protrude from the other part of the tank 160, 180. For example, the pin 60 may protrude from a side surface of the tank 160, 180 extending along the first direction. In this case, the attachment hole 80 is formed to open in the second direction and the pin 60 is inserted into the attachment hole 80 in the second direction. Alternatively, the pin 60 may protrude the side plate 110, 120 along the first direction.

A diameter of the pin hole 712 may be larger than an outer diameter of the insertion portion 720. Alternatively, the diameter of the pin hole 712 may be smaller than the outer diameter of the insertion portion 720. In other words, the outer diameter of the pin 60 may be larger or smaller than the diameter of the attachment hole 81.

The shapes of the pin 60, the pin hole 712, the support body 711 and the insertion portion 720 are not limited to the cylindrical shapes. They may have prismatic shapes.

The bushing mount 70 may have multiple breakable sections 713. Specifically, the support 710 may have the multiple breakable sections 713 at multiple angular positions. Notches, which are formed in the bushing mount 70 and located adjacent to each breakable section 713 in the radial direction, may extend radially outward at one of the multiple angular positions. When a great front impact force acts on the radiator 100, one or more of the breakable sections 713 may be broken. In this case, the present structure may allow the pin 60 to be removed out of the pin hole 712 from the center axis X through one or more of the breakable sections 713 in one or more of multiple angular directions. The present structure may account for collisions in multiple different directions.

The above-described changes and modifications may be applied to the holding structure of the second embodiment.

Additional advantages and modifications will readily occur to those skilled in the art. The disclosure in its broader terms is therefore not limited to the specific details, representative apparatus, and illustrative examples shown and described.

What is claimed is:

1. A bushing mount for an in-vehicle component disposed on a vehicle body, the bushing mount comprising:
   a support including a support body defining a pin hole therein; and
   an insertion portion connected to the support, wherein
   the support body includes a contact surface that abuts the vehicle body when the insertion portion is inserted into an attachment hole formed in the vehicle body,
   the support supports, when a pin of the in-vehicle component is inserted into the pin hole, the in-vehicle component while being interposed between the vehicle body and the in-vehicle component, and
   the support includes a removal portion that allows the pin to be removed out of the pin hole in a direction angled from a center axis of the pin hole, wherein the removal portion includes a breakable section having a radial thickness that is thinner than that of the support body, and the removal portion allows the pin to be removed out of the pin hole when the breakable section is broken by the pin.

2. The bushing mount according to claim 1, wherein the support body includes a holding surface that holds the in-vehicle component such that a distal end of the pin is positioned inside the pin hole.

3. The bushing mount according to claim 2, wherein the holding surface includes a first holding surface and a second holding surface, the first holding surface being formed on a side of the support body opposite to the contact surface in the axial direction of the center axis of the pin hole, the second holding surface being formed inside the pin hole, the first holding surface abuts the in-vehicle component when the pin is inserted into the pin hole, and the second holding surface abuts the distal end of the pin when the pin is inserted into the pin hole.

4. The bushing mount according to claim 2, wherein the holding surface is formed on a side of the support body opposite to the contact surface in the center axis of the pin hole, and the holding surface abuts the in-vehicle component when the pin is inserted into the pin hole.

5. The bushing mount according to claim 4, wherein the support body has a thickness between the contact surface and the holding surface in the center axis of the pin hole, and the thickness of the support body is longer than a length of the pin in the axial direction of the center axis.

6. The bushing mount according to claim 2, wherein the holding surface is formed inside the pin hole, and the holding surface abuts the distal end of the pin when the pin is inserted into the pin hole.

7. The bushing mount according to claim 1, wherein the contact surface of the support body is arranged to surround the insertion portion.

8. The bushing mount according to claim 7, wherein the contact surface has an annular shape surrounding the insertion portion.

9. The bushing mount according to claim 1, wherein the insertion portion has a cylindrical shape, and the center axis of the pin hole is offset from a center axis of the insertion portion.

10. The bushing mount according to claim 1, wherein the support is configured to be elastically deformable.

11. The bushing mount according to claim 10, wherein the support is made of a resin.

12. A bushing mount for an in-vehicle component disposed on a vehicle body, the bushing mount comprising:
a support including a support body defining a pin hole therein; and
an insertion portion connected to the support, wherein the support body includes a contact surface that abuts the vehicle body when the insertion portion is inserted into an attachment hole formed in the vehicle body, the support supports, when a pin of the in-vehicle component is inserted into the pin hole, the in-vehicle component while being interposed between the vehicle body and the in-vehicle component, and the support includes a removal portion that allows the pin to be removed out of the pin hole in a direction angled from a center axis of the pin hole, wherein the insertion portion has a cylindrical shape, and the pin hole is coaxial with the insertion portion.

13. The bushing mount according to claim 12, wherein the removal portion includes a slit extending in a direction away from the center axis of the pin hole, and the removal portion allows the pin to be removed out of the pin hole through the slit.

14. A holding structure for an in-vehicle component on a vehicle body, the holding structure comprising:
a pin disposed in the in-vehicle component,
a bushing mount including a support and an insertion portion, and
a holding base included in the vehicle body, wherein
the support includes a support body defining a pin hole therein,
the insertion portion is connected to the support,
the support body includes a contact surface that abuts the holding base when the insertion portion is inserted into an attachment hole formed in the holding base,
the support supports, when a pin of the in-vehicle component is inserted into the pin hole, the in-vehicle component while being interposed between the holding base and the in-vehicle component, and
the support includes a removal portion that allows the pin to be removed out of the pin hole in a direction angled from a center axis of the pin hole wherein
the removal portion includes a breakable section having a radial thickness that is thinner than that of the support body, and
the removal portion allows the pin to be removed out of the pin hole when the breakable section is broken by the pin.

15. The holding structure according to claim 14, wherein the in-vehicle component is a heat exchanger.

16. The holding structure according to claim 14, wherein the support body includes a holding surface that holds the in-vehicle component such that a distal end of the pin is positioned inside the pin hole.

17. The holding structure according to claim 16, wherein the holding surface includes a first holding surface and a second holding surface, the first holding surface being formed on a side of the support body opposite to the contact surface in the axial direction of the center axis of the pin hole, the second holding surface being formed inside the pin hole, the first holding surface abuts the in-vehicle component when the pin is inserted into the pin hole, and the second holding surface abuts the distal end of the pin when the pin is inserted into the pin hole.

* * * * *